Nov. 13, 1951  J. PIÉRI ET AL  2,574,840
FLEXIBLE MEDICAL PROBE
Filed July 3, 1950

INVENTORS:
JEAN PIERI &
JEAN CASALONGA

BY:

ATTORNEYS.

Patented Nov. 13, 1951

2,574,840

UNITED STATES PATENT OFFICE 2,574,840

FLEXIBLE MEDICAL PROBE

Jean Piéri and Jean Casalonga, Marseille, France

Application July 3, 1950, Serial No. 171,791
In France July 8, 1949

2 Claims. (Cl. 128—349)

Medical probes or catheters are generally used to carry out the catherisation of certain organs either for the purpose of extracting different matters therefrom or to explore them, or again to serve for the introduction of various medicaments.

These apparatus, either rigid or flexible, are of cylindrical form with an extremity having an opening. When it is necessary to reach certain cavities, probes must be used, the tip of which is bent to a certain angle, but this shape requires delicate use which necessarily enlarges the canal into which they are introduced giving rise to irritation of tearing of the walls, and also submitting the patient to an unpleasant or even painful sensation.

The object of the invention consists precisely in the construction of a probe or catheter having a directable terminal wall or tip which permits introduction with great facility into the canal or organ and to the depth desired. There is thus obtained the possibility of bringing its tip, at the desired moment, opposite to an orifice disposed at an angle which could be at 90° to the rectilinear trajectory.

This apparatus is essentially characterised by the disposition of its different members which confer to it by their combination, a maximum of useful effects. The probe comprises a stem, and of a shoulder carrying the control member and serving as a guide therefor to control the direction of orientation. The body proper will be of a predetermined texture and of a thickness sufficient to avoid buckling whilst however having a sufficient diameter to assure at the same time its flexibility and the passage of the control member. Its tip or reduced terminal wall will have an elasticity and plasticity determined with respect to the body of the probe to respond to the resultants of the forces arising from the vertical traction of the control cable which by the differences of strength of the body will ensure that its point of application and its intensity will modify the direction of the tip.

Its extremity comprising either a lead crown or an impregnation of mineral or other substances traceable by radioscopy will give the possibility of following on the screen the advance of its tip. The most difficult organs to reach, such as canals and other cavities will thus be able to be put into direct communication with the probe which will be usable for all localised treatment. The medical applications will thus be considerably extended. The channel will serve for the introduction into the part to be treated of such medicaments which could only be indirectly distributed with a lesser and possibly dangerous effect for other affections. Furthermore, the same channel could be used just as well as an introductory agent or as an extractor of liquid, solid, pasty or gaseous products.

The probe is mounted on a flexible metallic handle, the curvature of which corresponds to the shape of the organ or to the entrance of the organ which it is desired to catheterise.

On the annexed drawings, which are primarily schematic, given, by way of non-limiting example, of one form of construction of the subject of the invention:

Figure 1:
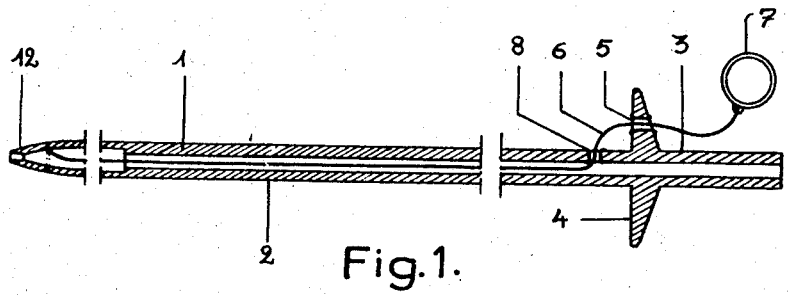
Figure 1 shows the assembly of the probe seen in longitudinal section.
Figure 2:
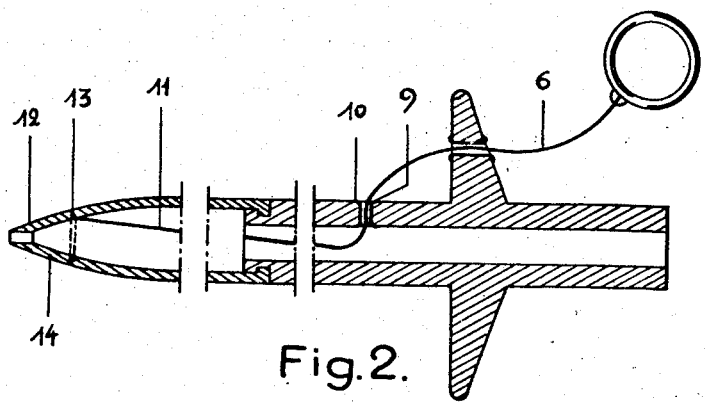
Figure 2 shows, to a larger scale, with part in section, the tip.
Figure 3:
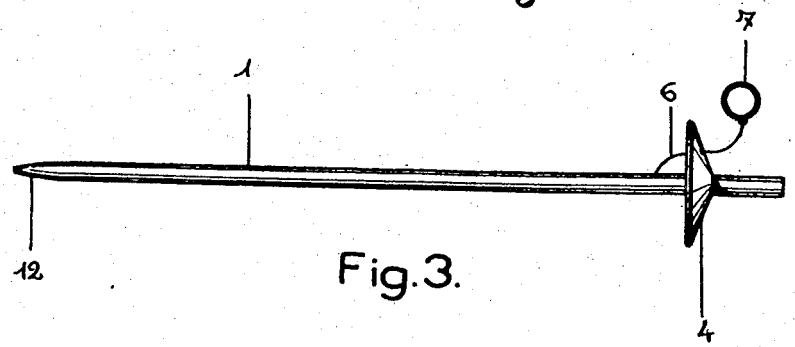
Figure 3 is a side elevation of the probe.

The probe consists of a cylindrical body 1 of flexible material having a longitudinal channel therein and with a wall 2 having a desired thickness in such a manner as to give to the whole a certain rigidity without nevertheless prejudicing its flexibility. 3 is a stem for the probe, which is provided with a circular shoulder 4 forming a directing handle with an aperture 5 guiding the cable 6 which terminates at one end in a traction member 7 and which penetrates into the body 1 of the probe through the aperture 8 reinforced at the point of contact by a metallic or other sheath having a sufficient resistance and with rounded edges 9 and 10.

The end 11 of cable 6 is secured internally to the tapered or reduced terminal end or tip 12 remote from the aperture 8 by a metal ring 13 inset in the wall 14 in order to prevent any tearing out of the flexible substance.

The cable 6 passes from the tip through the longitudinal channel of the body, emerges from the body through the aperture therein, and passes thence through the aperture of the shoulder.

The walls of the body of the probe have at their extremity adjacent the tip 12 a reduced thickness in order to increase its resiliency and facilitate the bending without thereby causing any obturation.

The operation of the probe is as follows: The probe is introduced into the desired canal and the operator can then follow the penetration by radioscopy by reason of the metal portion 13. When, for example, it reaches a cavity at a specified angle, a pull will be applied to the cable 6 so as to cause the tip 12 to rise in such a manner that the tip is placed in the lifted position in the axis of the cavity which is to be reached. At this moment the cable can either be made fast by any appropriate means or released after the tip has penetrated into the desired cavity.

This movement guided from a distance by the stem and handle and combined with that given to the body of the probe by the rotation of the shoulder 4 will permit of obtaining a vertical displacement through 360 degrees, as well as a counter-bending of the tip exceeding 90 degrees and reaching to about 170 degrees.

We claim:

1. Flexible probe for medical purposes comprising a flexible probe body of predetermined thickness having a longitudinal channel therein and an apertured wall, an orientable terminal tip for said body remote from the aperture therein and having walls of reduced thickness, an apertured shoulder portion on the body adjacent the aperture of said body, and a cable connected internally to the tip and passing through the longitudinal channel of the body, said cable emerging from the body through the aperture therein and passing thence through the aperture in the shoulder.

2. Flexible probe for medical purposes comprising a flexible probe body of predetermined thickness having a longitudinal channel therein and an apertured wall, an orientable terminal tip for said body remote from the aperture therein and having walls of reduced thickness, an apertured shoulder portion on the body adjacent the aperture of said body, a metal ring inset in the terminal tip, a cable having one end connected to said metal ring, passing through the longitudinal channel of the body, said cable emerging from the body through the aperture therein and passing thence through the aperture in the shoulder, and a traction member secured to the other end for said cable.

JEAN PIÉRI.
JEAN CASALONGA.

REFERENCES CITED

The following references are of record in the file of this patent:

UNITED STATES PATENTS

| Number | Name | Date |
|---|---|---|
| 2,498,692 | Mains | Feb. 28, 1950 |

FOREIGN PATENTS

| Number | Country | Date |
|---|---|---|
| 707,333 | France | Apr. 13, 1931 |